(12) United States Patent
Urlaub et al.

(10) Patent No.: US 6,599,381 B2
(45) Date of Patent: Jul. 29, 2003

(54) COMBINATION ULTRASONIC WELD HORN/VACUUM

(75) Inventors: Kevin J. Urlaub, Boise, ID (US); Michael W. Keyes, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 64 days.

(21) Appl. No.: 09/967,284

(22) Filed: Sep. 28, 2001

(65) Prior Publication Data

US 2003/0062110 A1 Apr. 3, 2003

(51) Int. Cl.$^7$ .............................. B29C 65/08
(52) U.S. Cl. ............ 156/73.1; 156/73.6; 156/285; 156/569; 156/580.2
(58) Field of Search .................. 156/73.1, 285, 156/381, 382, 569, 580.1, 580.2, 73.6; 264/442, 443, 445; 425/174.2; 228/1.1, 110.1

(56) References Cited

U.S. PATENT DOCUMENTS

| | | | | |
|---|---|---|---|---|
| 4,865,680 A | * | 9/1989 | Pierson | 156/580.2 |
| 4,865,687 A | * | 9/1989 | Pierson | 156/73.1 |
| 5,480,501 A | * | 1/1996 | Stewart et al. | 156/73.1 |
| 5,614,057 A | * | 3/1997 | Conley, Jr. et al. | 156/354 |
| 6,238,503 B1 | | 5/2001 | Kakehi | 156/73.1 |

* cited by examiner

Primary Examiner—James Sells

(57) ABSTRACT

A method and device for vacuum assist picking and placing a first component part relative to a second component part in preparation for ultrasonically welding the first component part to the second component part and ultrasonically welding the first component part to the second component part with the combination ultrasonic weld horn/vacuum pickup. A combination ultrasonic weld horn/vacuum pickup includes an ultrasonic weld horn including a vacuum conduit. A vacuum or negative pressure is directed through the vacuum conduit providing necessary suction at the tip of the weld horn to permit the weld horn to pick and hold a first component part during positioning of the part for welding to a second component part. In the preferred embodiment of the invention, the conduit is formed as a bore milled along a longitudinal axis of the weld horn.

15 Claims, 6 Drawing Sheets

50

```
┌─────────────────────────────────────────┐
│ VACUUM ASSIST PICKING A FIRST COMPONENT │
│ PART FROM A FIRST COMPONENT PART        │
│ SUPPLY STATION WITH A COMBINATION       │—51
│ ULTRASONIC WELD HORN/VACUUM PICKUP      │
└─────────────────────────────────────────┘
                    │
┌─────────────────────────────────────────┐
│ POSITIONING THE COMBINATION ULTRASONIC  │
│ WELD HORN/VACUUM PICKUP AND THE FIRST   │
│ COMPONENT PART RELATIVE TO A SECOND     │—52
│ COMPONENT PART IN PREPARATION FOR       │
│ ULTRASONICALLY WELDING THE FIRST        │
│ COMPONENT PART TO THE SECOND COMPONENT  │
│ PART                                    │
└─────────────────────────────────────────┘
                    │
┌─────────────────────────────────────────┐
│ ULTRASONICALLY WELDING THE FIRST        │
│ COMPONENT PART TO THE SECOND COMPONENT  │
│ PART WITH THE COMBINATION ULTRASONIC    │—53
│ WELD HORN/VACUUM PICKUP                 │
└─────────────────────────────────────────┘
```

*Fig. 6*

COMBINATION ULTRASONIC WELD HORN/ VACUUM

FIELD OF THE INVENTION

This invention relates generally to ultrasonic welding processes and more particularly to a method and device for picking and placing component parts for an ultrasonic welding process.

BACKGROUND OF THE INVENTION

Ultrasonic welding joins parts by applying mechanical energy from a high frequency vibration source at a joint formed between two component parts. Generation of ultrasonic energy includes the conversion of high frequency electrical energy by an electromechanical converter or transducer to a mechanical vibration. Mechanical vibrations are amplified by an amplitude transformer and applied to a workpiece by means of an ultrasonic "horn". In order to effect the weld joint, a first component part is typically positioned in a fixture while a second component part is mechanically vibrated against the relatively stationary first component part. The mechanical vibration is produced at a frequency generally in the range of 20,000 (20 kHz) or 40,000 (40 kHz) cycles per second. The high frequency vibration is ordinarily accompanied by a compressive force generated by the horn between the mechanically vibrated second component part and the relatively stationary first component part. The ultrasonic welding process is capable of breaking down films and oxides creating a coalescence between the component parts at the site of the weld. A superior joint may be achieved without the use of filler materials, fluxes, adhesives, epoxies or mechanical connectors.

One challenge common in production settings, wherein ultrasonic welding processes are employed, relates to picking and placing of component parts to be welded. Commonly, during an ultrasonic welding process, a relatively stationary first component part is held in a fixture, "nest" or "anvil". The fixture is most often configured to support and conform at least generally to a configuration of the first component part. A second part to be attached by welding to the first part must be picked and placed in position relative to the first part prior to welding. According to the prior art, this has been accomplished by a separate apparatus commonly necessitating a distinct workstation and oftentimes an additional and attendant transport mechanism for transporting the second part, once it is picked, from a parts pickup station to a fitting station wherein the second part is placed in position for welding. The transport mechanism then transports the parts to a second position wherein the actual ultrasonic welding process takes place. In addition, this arrangement typically requires that either or both the first part and the second part be designed to provide a physical feature for trapping or temporarily holding the second piece in relationship to the first piece during transport to the welding station. Alternately, the first part may be temporarily attached to the second part by a separate and distinct process such as heat staking or "tacking".

There may be advantage in providing an ultrasonic weld horn that includes the additional functionality of picking and placing a second part in position for welding.

SUMMARY OF THE INVENTION

The present invention is directed to a combination ultrasonic weld horn/vacuum pickup including an ultrasonic weld horn having a vacuum conduit. A vacuum or negative pressure is directed through the vacuum conduit providing necessary suction at the tip of the weld horn to permit the weld horn to pick and hold a first component part during positioning of the part for welding to a second component part. In the preferred embodiment of the invention, the conduit is formed as a bore milled along a longitudinal axis of the weld horn. The longitudinal bore is joined by a second aperture drilled or milled from the side wall of the weld horn and intersecting the longitudinal bore at a neutral point along the horn. The neutral point is a point located along the length of the weld horn that is subjected to a minimum of movement during the ultrasonic welding process. Location of the weld horn at the neutral point significantly reduces or otherwise eliminates breakage or failure of the horn or the fitting attaching the vacuum source to the weld horn due to stresses observed in the weld horn during the ultrasonic welding process. The diameter of the bore may vary depending upon the vacuum being applied through the conduit and the mass of the part being picked. The tip of the weld horn may be further adapted or configured to conform or otherwise accommodate the configuration of the part being picked. The combination ultrasonic weld horn/vacuum pickup provides both the functionality of picking a first part and placing the first part in relationship to a second part and ultrasonically welding the first part to the second part.

The present invention is directed to an ultrasonic welding system including a part supply station, a weld station, a combination ultrasonic weld horn/vacuum pickup and a transport mechanism for transporting the ultrasonic weld head between the part supply station and the weld station. The weld station includes a fixture for supporting a first component part. The part supply station includes a location where the first component part or a plurality of sequentially fed first component parts are positioned for pickup by the combination ultrasonic weld horn/vacuum pickup. The weld station may be configured as a turret or other automated production facility component for sequentially positioning a plurality of second component parts for fitting with and welding to the first component parts. The transport mechanism includes a combination ultrasonic weld horn/vacuum pickup support member, an X axis transport mechanism and a Z axis transport mechanism.

The present invention is also directed to a method for picking a first part and placing the first part in relationship to a second part in preparation for ultrasonically welding the first part to the second part. The method for joining two parts employing an ultrasonic welding process includes the steps of vacuum assist picking a first component part from a first component part supply station with a combination ultrasonic weld horn/vacuum pickup, positioning the combination ultrasonic weld horn/vacuum pickup and the first component part relative to the second component part in preparation for ultrasonically welding the first component part to the second component part and ultrasonically welding the first component part to the second component part with the combination ultrasonic weld horn/vacuum pickup.

BRIEF DESCRIPTION OF THE DRAWINGS

FIG. 6 is a flow chart depicting the steps of a method for method for picking a first part and placing the first part in relationship to a second part in preparation for ultrasonically welding the first part to the second part according to the present invention.

DETAILED DESCRIPTION OF THE INVENTION

Figure 1:
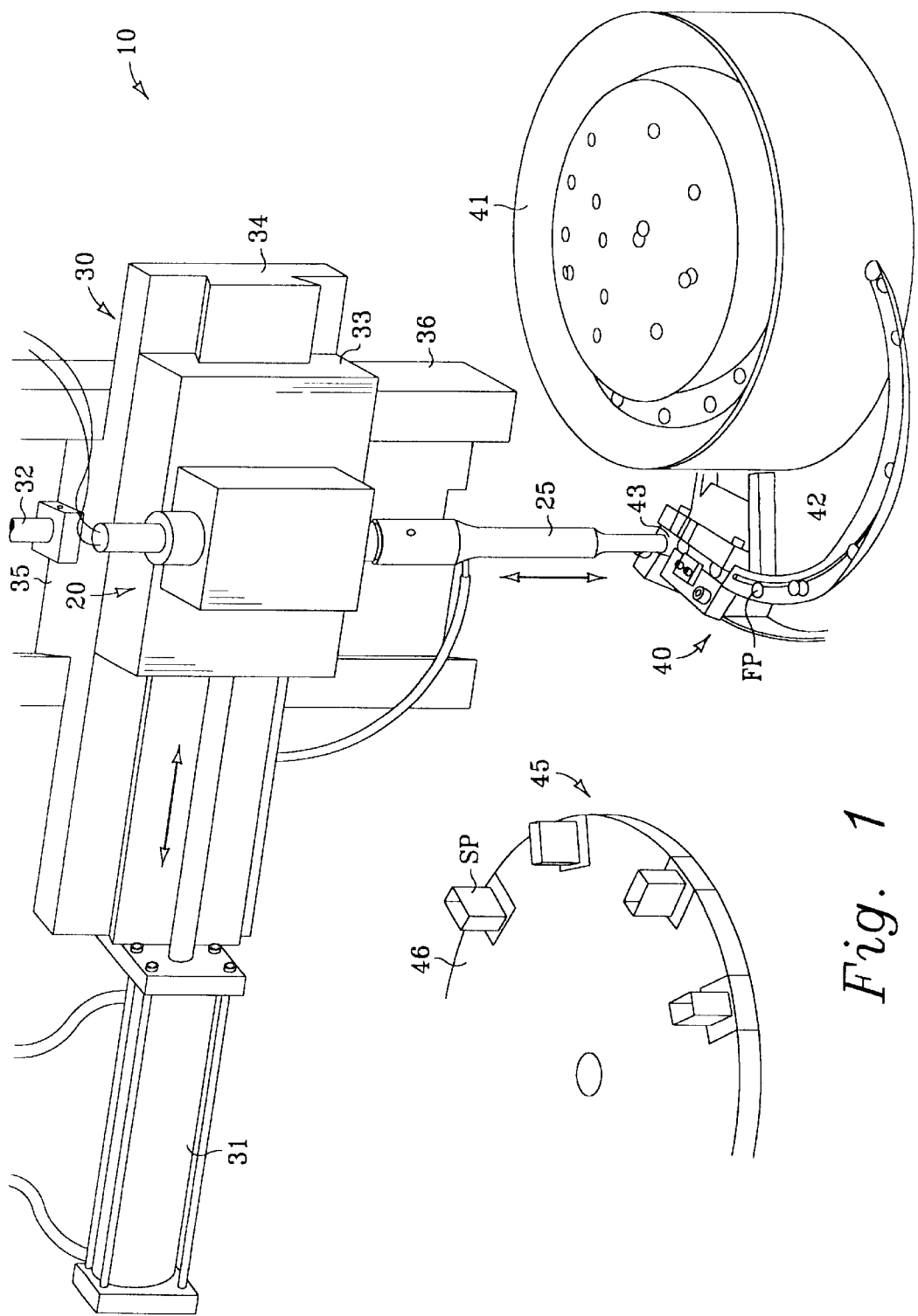
FIG. 1 is a representative perspective view of an ultrasonic welding system according to the present invention.
Figure 2:
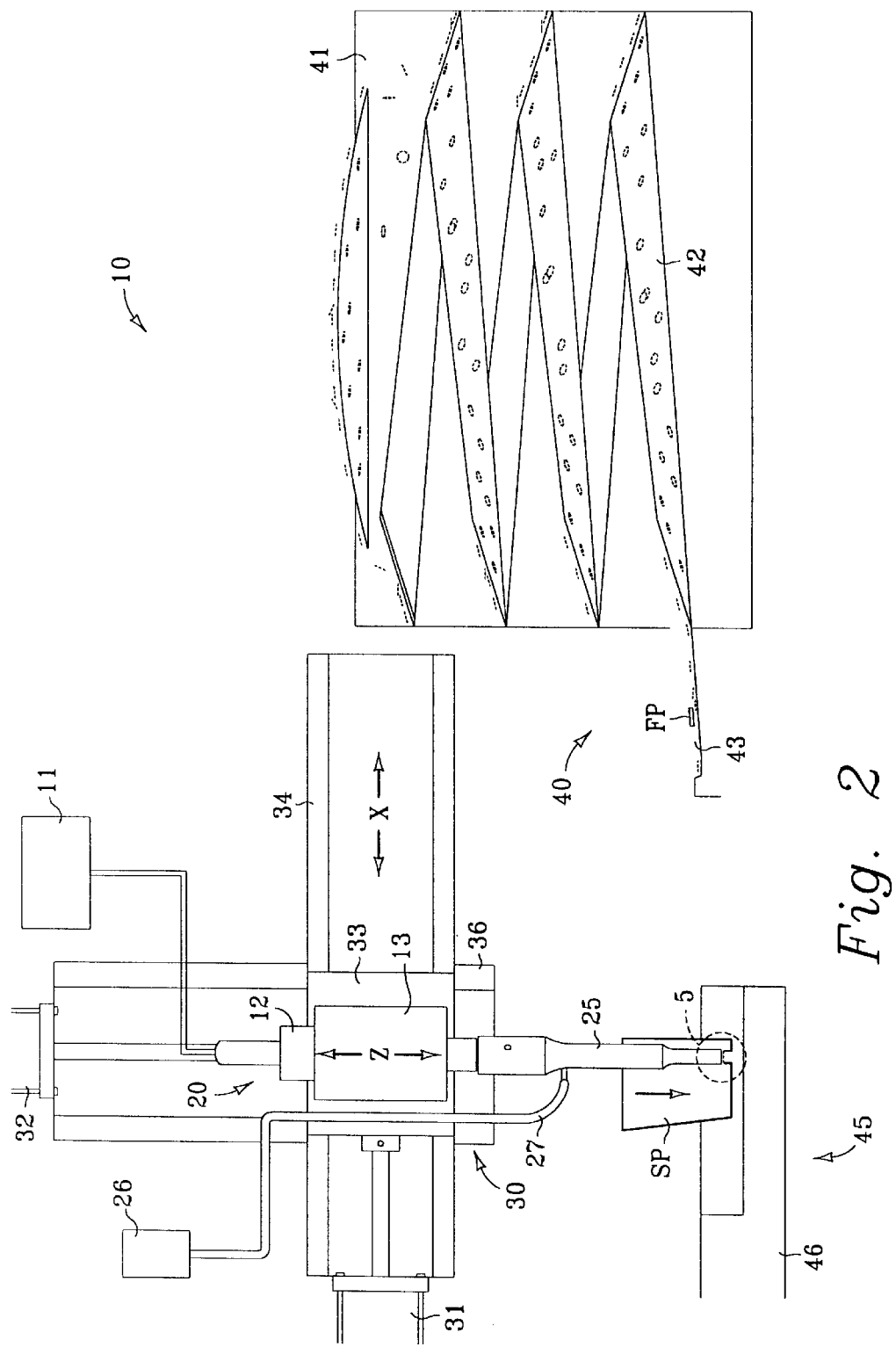
FIG. 2 is a representative schematic of an ultrasonic welding system according to the present invention.

FIGS. 1 and 2 show ultrasonic welding system 10 including part supply station 40, weld station 45, ultrasonic weld head 20 including combination ultrasonic weld horn/vacuum pickup 25 and transport mechanism 30 for transporting ultrasonic weld head 20 between part supply station 40 and weld station 45. Part supply station 40 includes vibratory feed bin 41. A plurality of first parts FP are fed continuously from vibratory feed bin 41 along guide 42 to pickup pad 43. Weld station 45 includes carousel 46 onto which a plurality of second parts SP, are placed and positioned for welding.

Transport mechanism 30 includes X axis transport pneumatic cylinder 31 for advancing carriage 33. Ultrasonic weld head 20 is attached along horizontal track 34. Transport mechanism 30 also includes Z axis transport pneumatic cylinder 32 for advancing trolley 35 along vertical track 36.

FIG. 2 also shows ultrasonic welding system 10 including power supply 11, transducer 12 and booster 13. Combination ultrasonic weld horn/vacuum pickup 25 is pneumatically connected to vacuum source 26 by vacuum line 27. In the embodiment shown, vacuum source 26 is a "house" vacuum providing a negative pressure of approximately 10 psi or 28 inches of mercury, adequate to pick a small part such as first part FP, which in the illustration shown is a small metallic screen having a mass of approximately one gram. The vacuum required to pick any particular piece may be readily determined.

Figure 3:
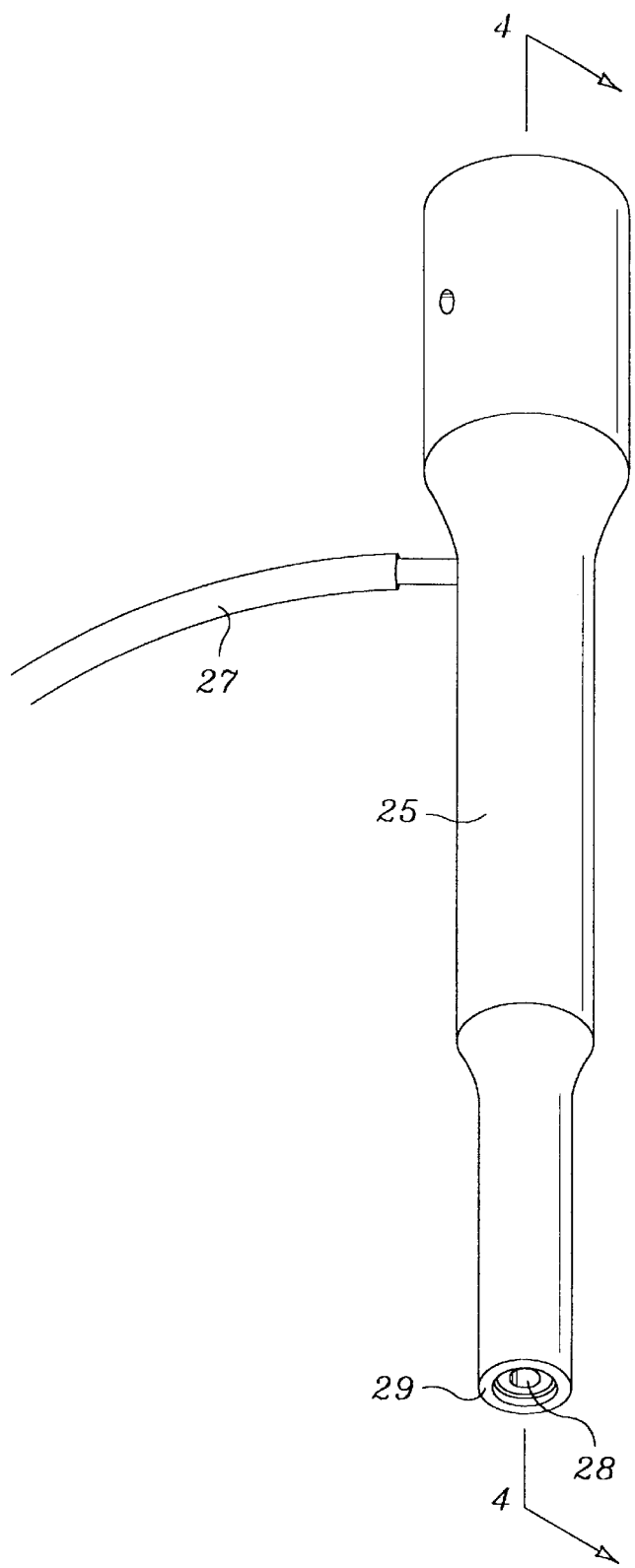
FIG. 3 is a representative perspective view of a combination ultrasonic weld horn/vacuum pickup according to the present invention.
Figure 4:
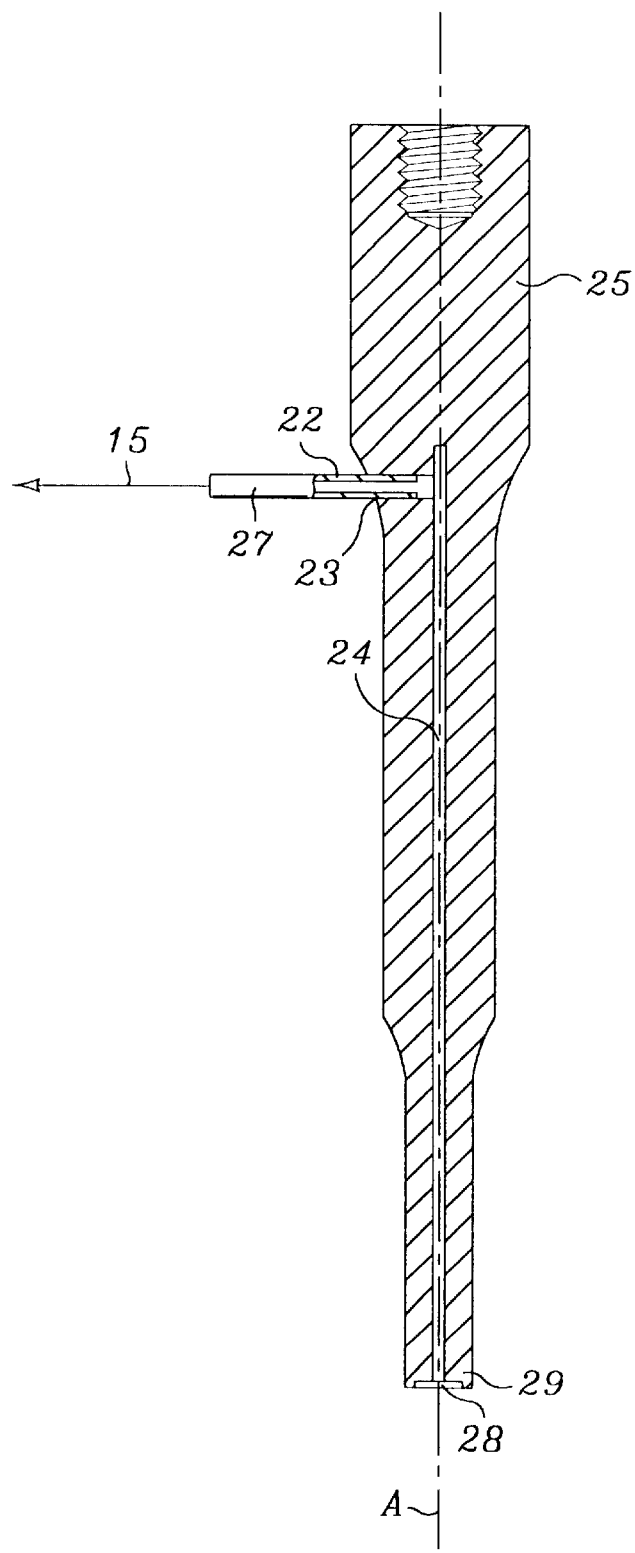
FIG. 4 representative side cutaway view of a combination ultrasonic weld horn/vacuum pickup according to the present invention.

Referring to FIGS. 3 and 4 combination ultrasonic weld horn/vacuum pickup 25 is pneumatically connected to vacuum line 27. As shown in FIG. 4, combination ultrasonic weld horn/vacuum pickup 25 includes central bore 24 which extends axially through combination ultrasonic weld horn/vacuum pickup 25 along longitudinal axis A. Aperture 28 forms an end of central bore 24 at tip 29. Lateral bore 23 extends through combination ultrasonic weld horn/vacuum pickup 25 and intersects central bore 24. A first end or nipple 22 inserts into lateral bore 23 and vacuum line 27 attaches to a second end of nipple 22.

Figure 5:
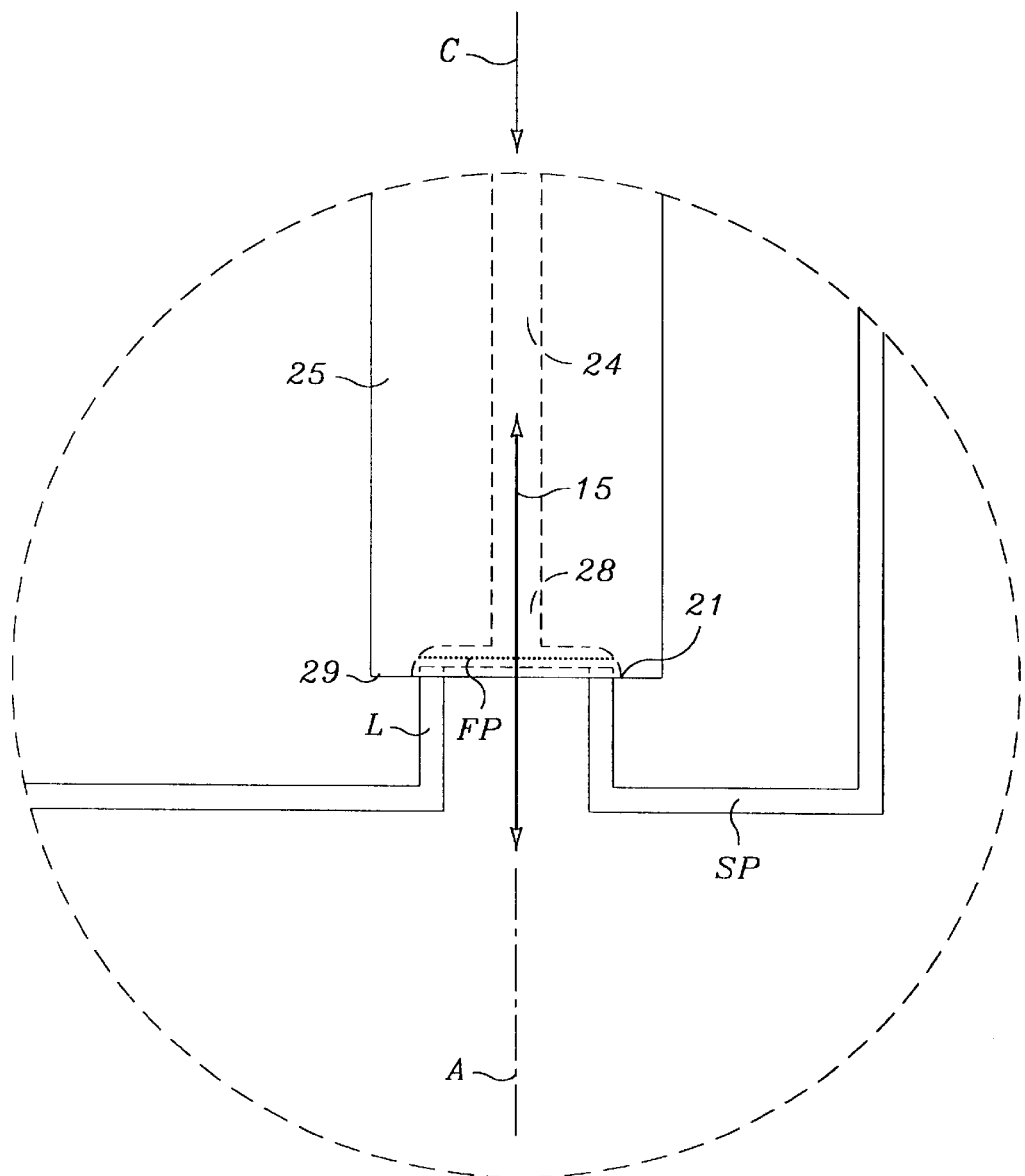
FIG. 5 is a representative cross-sectional exploded view of the tip of a combination ultrasonic weld horn/vacuum.

FIG. 5 is a representative cross-sectional exploded view illustrating central bore 24 which extends axially through combination ultrasonic weld horn/vacuum pickup 25 along longitudinal axis A. Aperture 28 forms an end of central bore 24 at tip 29. Tip 29 includes recess 21 which is sized to receive and center first part FP as it is lifted into recess 21 by vacuum pressure.

In use, and referring first to FIG. 1, X axis transport pneumatic cylinder 31 extends and carriage 33, to which ultrasonic weld head 20 is attached, is transported along horizontal track 34 on the X axis positioning combination ultrasonic weld horn/vacuum pickup 25 above pickup pad 43. Z axis transport pneumatic cylinder 32 extends and trolley 35 moves down vertical track 36 along the Z axis to a pickup elevation above pickup pad 43. Referring to FIG. 5, vacuum 15 draws first part FP into recess 21.

Referring again to FIG. 1, Z axis transport pneumatic cylinder 32 retracts and trolley 35 moves up vertical track 36 along the Z axis. X axis transport pneumatic cylinder 31 retracts transporting ultrasonic weld head 20 along horizontal track 34 on the X axis positioning combination ultrasonic weld horn/vacuum pickup 25 above second part SP at weld station 45.

Referring to FIG. 2, Z axis transport pneumatic cylinder 32 extends and trolley 35 moves down along the Z axis to position for welding. Referring to FIG. 5, first part FP is held in recess 21 by vacuum 35 and is centered on land L of second part SP. Mechanical vibration required for ultrasonic welding is provided by ultrasonic weld head 20 and compressive force C, also required for acceptable weld quality, is generated by Z axis transport pneumatic cylinder 32 along longitudinal axis A.

FIG. 6 is a flow chart depicting the steps of a method for an ultrasonic welding process 50 including the steps of vacuum assist picking a first component part from a first component part supply station with a combination ultrasonic weld horn/vacuum pickup 51, positioning the combination ultrasonic weld horn/vacuum pickup and the first component part relative to a second component part in preparation for ultrasonically welding the first component part to the second component part 52 and ultrasonically welding the first component part to the second component part with the combination ultrasonic weld horn/vacuum pickup 53.

While the invention has been described with reference to the detailed embodiments, this is not meant to be construed in a limiting sense. Various modifications, changes, variations, substitutions and equivalents to the described embodiment, as well as additional embodiments of the invention, will be apparent to persons skilled in the art upon reference to this description. It is therefore contemplated that the appended claims will cover any and all such modifications or embodiments as fall within the true scope of the invention.

What is claimed is:

1. An ultrasonic welding system comprising:
   a weld horn;
   a vacuum conduit connected to the weld horn; and
   a vibratory feed bin for feeding a first part to be picked up by the weld horn.

2. The ultrasonic welding system of claim 1 further comprising a vacuum source pneumatically connected to the vacuum conduit providing a negative pressure through the vacuum conduit for vacuum assist lifting the first part against a distal end of the weld horn.

3. The ultrasonic welding system of claim 1 further comprising a recess formed at a distal end of the weld horn, the recess adapted to receive and center the first part.

4. The ultrasonic welding system of claim 1 wherein the vacuum conduit further comprises a bore formed through a length of the weld horn.

5. The ultrasonic welding system of claim 1 wherein the vacuum conduit further comprises a bore formed through a length of the weld horn along a longitudinal axis of the weld horn.

6. The ultrasonic welding system of claim 1 wherein the vacuum conduit further comprises:
   a central bore formed through a length of the weld horn along a longitudinal axis of the weld horn; and
   a lateral bore formed at an angle to the longitudinal axis of the weld horn, the lateral bore pneumatically connected to and intersecting the central bore.

7. An ultrasonic welding system comprising:

a part supply station that includes a vibratory feed bin for sequentially positioning a plurality of first parts for pickup;

a weld station located adjacent to the part supply station for sequentially positioning a plurality of second parts for ultrasonically welding one of the plurality of first parts to one of the plurality of second parts;

an ultrasonic weld head including a combination ultrasonic weld horn/vacuum assist pickup having a weld horn and a vacuum conduit connected to the weld horn, the ultrasonic weld head transportable between the part supply station and the weld station; and a transport mechanism, the ultrasonic weld head attached to the transport mechanism, the transport mechanism including an X axis transport device and a Z axis transport device.

8. The ultrasonic welding system of claim 7 further comprising a vacuum source pneumatically connected to the vacuum conduit providing a negative pressure through the vacuum conduit for vacuum assist lifting one of the plurality of first parts against a distal end of the weld horn.

9. The ultrasonic welding system of claim 7 further comprising a recess formed at a distal end of the weld horn, the recess adapted to receive and center one of the plurality of first parts.

10. The ultrasonic welding system of claim 7 wherein the vacuum conduit further comprises a bore formed through a length of the weld horn.

11. The ultrasonic welding system of claim 7 wherein the vacuum conduit further comprises a bore formed through a length of the weld horn along a longitudinal axis of the weld horn.

12. The ultrasonic welding system of claim 7 wherein the vacuum conduit further comprises:

a central bore formed through a length of the weld horn along a longitudinal axis of the weld horn; and a lateral bore formed at an angle to the longitudinal axis of the weld horn, the lateral bore pneumatically connected to and intersecting the central bore.

13. The ultrasonic welding system of claim 7 wherein the ultrasonic weld head further comprises:

a booster connected to the weld horn; and a transducer connected to the booster.

14. The ultrasonic welding system of claim 7 further comprising a power supply connected to the ultrasonic weld head.

15. A method for ultrasonically welding two parts employing a combination ultrasonic weld horn/vacuum assist pickup having a weld horn and a vacuum conduit connected to the weld horn ultrasonic welding process including the steps of:

vacuum assist picking a first part from a pickup pad coupled to a vibratory feed bin with the combination ultrasonic weld horn/vacuum pickup;

positioning the combination ultrasonic weld horn/vacuum pickup and the first part relative to the second part in preparation for ultrasonically welding the first part to the second part; and ultrasonically welding the first part to the second part with the combination ultrasonic weld horn/vacuum pickup.

* * * * *